: 2,934,430
Patented Apr. 26, 1960

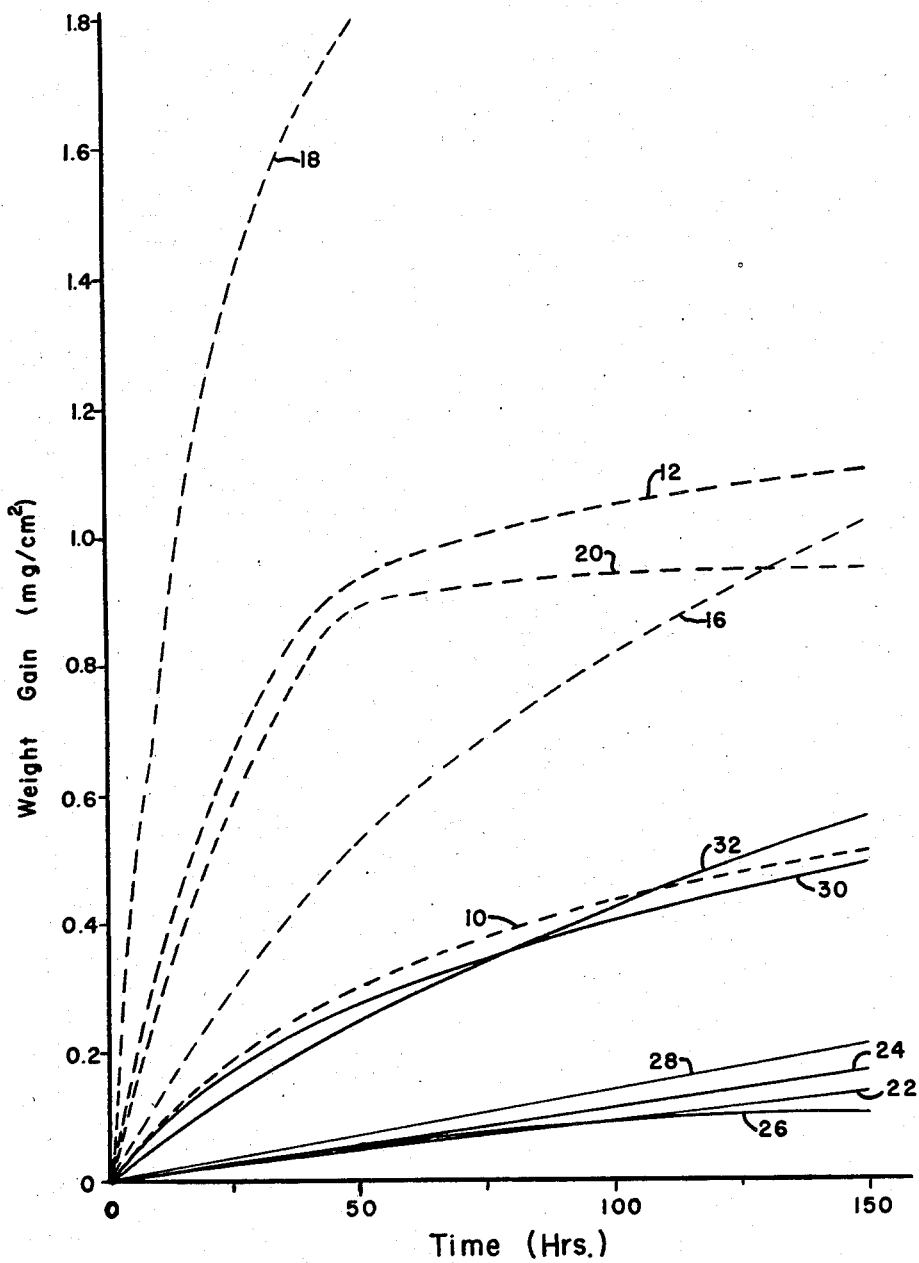

2,934,430
HIGH TEMPERATURE BEARING ALLOYS

Leonard V. Klaybor and Paul R. Borneman, Dunkirk, and Donald L. Byrne, Fredonia, N.Y., assignors to Allegheny Ludlum Steel Corporation, Brackenridge, Pa., a corporation of Pennsylvania Application February 4, 1959, Serial No. 791,087

5 Claims. (Cl. 75—126)

This invention relates to high temperature bearing materials, and particularly to bearing alloys that possess high hardness, strength and oxidation resistance at elevated temperatures.

Bearing and jet engine manufacturers are constantly seeking newer and better materials to operate at higher temperatures for longer periods of time. In this way they are attempting to increase the useful life of their engines and cut down on costly maintenance and periodic overhauling.

The emphasis on steels used for these bearing applications has shifted, from the standard bearing analysis of vacuum remelted SAE Type 52100 steel and modifications of this analysis containing aluminum which were ideal for operating at temperatures of about 400° F., to higher alloy steels such as vacuum remelted HTB-2 (.80% C., .30% Mn, 4% Cr, 1% V, 4% Mo, balance essentially Fe) and HTB-3 (.57% C, .30% Mn, 1.15% Si, 4.75% Cr, .6% V and 5.25% Mo, balance essentially Fe).

The reason for this shift is that formerly the operating temperature requirements involved long time exposure to the temperatures of about 400° F. and the 52100 steel or 52100 steel+Al exhibited the necessary and desired properties of a high hardness level on hardening and tempering, adequate resistance to softening at these temperatures for long periods of time and sufficient oxidation resistance. However, operating temperatures increased to 800° F. and higher, which has brought about the change to the HTB-2 and HTB-3 analysis that possesses the necessary high hardness level on hardening and tempering, resistance to softening at the higher temperatures for long periods of time and adequate oxidation resistance. Requirements such as set forth above are now demanding materials that will possess the desired properties of high hardness levels on hardening and tempering, resistance to softening at high temperatures for long periods of time and adequate oxidation resistance at temperatures of about 1000° F. 1100° F. At these temperatures the 52100 or 52100+Al alloy steels are completely unsatisfactory and the HTB-2 and HTB-3 analyses exhibit excessive oxidation.

An alloy composition has now been discovered that possesses excellent high temperature properties for use as bearing material at temperatures of about 1000° F. and 1100° F.

It is therefore the object of the present invention to provide a bearing material that possesses a high hardness level on hardening and tempering, resistance to softening when subjected to high temperatures for long periods of time, and which exhibits good oxidation resistance.

Another object of the present invention is to provide a bearing alloy that exhibits a high hardness level on hardening and tempering, resistance to softening when exposed to temperatures of about 1000° F. and 1100° F. for long periods of time, and exhibits adequate oxidation resistance when employed at temperatures of about 1000° F. to 1100° F.

Other objects and advantageous features will be obvious from the following specification and the accompanying drawing, the single figure of which is a graph illustrating the superior oxidation resistance of the present alloy over that of the HTB-2 and HTB-3 alloys now employed for such applications as bearing steels.

In general, the present invention involves bearing steels containing relatively high silicon, chromium and molybdenum contents and that exhibit highly desirable hardness, resistance to softening, and resistance to oxidation properties, particularly at temperatures of from about 1000° F. to 1100° F. The following approximate analyses are the broad or acceptable range of alloying composition, and a highly preferred and desired range that may be employed for high temperature bearing applications:

|  | Broad Range, Percent/Wt. | Preferred Range, Percent/Wt. |
| --- | --- | --- |
| C | .60– 1.00 | .60– .75 |
| Mn | .20– 1.10 | .20– .40 |
| Si | 1.00– 2.25 | 1.00– 1.25 |
| Cr | 11.00–17.50 | 11.50–12.50 |
| Mo | 3.00– 5.50 | 5.00– 5.50 |
| Fe | Balance | Balance |

The primary function of the chromium and silicon contents is to provide the necessary high temperature oxidation resistance. However, molybdenum also contributes to this property. It is to be noted that molybdenum is present in almost equivalent amounts with the HTB-2 and HTB-3 alloys. The addition of manganese is for its usual purpose and function of purging the steel of oxygen and sulfur during its manufacture. However, manganese affects the properties of hardenability and thus is preferably confined to within the ranges set forth. The range of carbon given, of course, is necessary to provide the desired hardness and strength, as is its usual function when combined with iron.

In the present compositions, as in other bearing steels of this type, additions of vanadium are desirable, although not essential. A vanadium content of up to 1% may be employed in compositions falling within either the broad or preferred range of the present invention. Such additions perform the functions of imparting grain refinements, increase the resistance of the alloy to tempering and increase wear resistance.

The advantageous properties of the present alloys, particularly those of a mechanical nature, are best shown by way of the following specific examples and tests conducted on alloys within the broad and narrow ranges given above. Four test heats of the alloy falling within the ranges of the present invention and identified as AL 129, AL 130, AL 131 and AL 132 were tested as follows:

PROPERTIES OF AL 129

Typical analysis

Carbon _____ .70
Manganese _____ .30
Silicon _____ 1.00
Chromium _____ 12.00
Molybdenum _____ 5.25

Hardening and tempering

Samples of 1" rd. bar 2" long were preheated at 1500° F. and hardened at the indicated temperature, being held 5 minutes at temperature and oil quenched. They were fractured and rated as to Shepherd fracture grain size and as quenched hardness. Half of each sample was then tempered for two hours at the indicated temperature and their hardness measured between each successive temper.

OIL QUENCHED

| Hardening Temp., °F. | Shepherd Rating | As Quenched Hardness Rc | Tempering Temperature, °F. | | | | | |
|---|---|---|---|---|---|---|---|---|
| | | | 700 | 900 | 1,000 | 1,050 | 1,100 | 1,200 |
| 1,850 | 9 | 59 | 56 | 58 | 56 | 52 | 46 | 40 |
| 1,900 | 9 | 60 | 56 | 57.5 | 58 | 52 | 48 | 44 |
| 1,950 | 9 | 61 | 57.5 | 60 | 60.5 | 56 | 48.5 | 46 |
| 2,000 | 9 | 61 | 57.5 | 61 | 62 | 58 | 51 | 47 |
| 2,050 | 9 | 59 | 54 | 57.5 | 62 | 61 | 53 | 48 |
| 2,100 | 8 | 52.5 | 50 | 52.5 | 55 | 62 | 55 | 50 |

Brinell hardness at elevated temperature

Samples 1" rd. by ¾" long were preheated at 1500° F., hardened at 2050° F., quenched in oil and double tempered at the indicated temperature for two hours. Samples were held at the testing temperature for 30 minutes prior to testing. Hardness of the pieces were checked both before and after the elevated temperature hardness measurement.

| Tempering Temperature, °F. | Heat Treated Hardness, Rc | Testing Temperature, °F. | Hot Hardness, BHN | Room Temperature Hardness After Test, Rc |
|---|---|---|---|---|
| 1,000 | 61 | 600 | 600 | 62 |
| 1,000 | 62 | 800 | 600 | 62 |
| 1,000 | 62 | 1,000 | 555 | 62 |
| 1,100 | 54 | 1,100 | 387 | 54 |

Oxidation resistance

Two samples were preheated at 1500° F., hardened at 2050° F., oil quenched and one piece tempered at 1000° F. and the other at 1100° F. for two hours. After being ground to approximately 1" square by .250" thick, they were placed in small crucibles (to collect flaking scale), weighed and put in an electric muffle furnace with an air atmosphere. After exposure for 50 hours and 150 hours at 1000° F. and 1100° F., the crucibles were removed and weighed to determine increase in weight due to oxidation. Knowing the area of exposed surface, the data were converted to increase in weight per unit of area and are expressed in milligrams per square centimeter.

| Grade | Hardening Temperature, °F. | Increase in weight in mg. per cm.² | | | |
|---|---|---|---|---|---|
| | | 1,000° F. Temper | | 1,100° F. Temper | |
| | | 50 hrs. | 150 hrs. | 50 hrs. | 150 hrs. |
| AL-129 | 2,050 | .0383 | .141 | .311 | .519 |

Resistance to tempering for long periods of time

After the oxidation resistance samples were weighed, they were ground down below the scale and decarburization and their hardness measured. This supplied data on the resistance to tempering for 150 hours at both 1000° F. and 1100° F.

| Grade | Hardening Temperature, °F. | Rockwell C Hardness After— | | | |
|---|---|---|---|---|---|
| | | 1,000° F. Temper | | 1,100° F. Temper | |
| | | 2 hrs. | 150 hrs. | 2 hrs. | 150 hrs. |
| AL-129 | 2,050 | 61 | 54 | 54 | 44 |

PROPERTIES OF AL-130
Typical analysis

| | |
|---|---|
| Carbon | .60 |
| Manganese | 1.00 |
| Silicon | 1.00 |
| Chromium | 12.00 |
| Molybdenum | 3.25 |

Hardening and tempering

Samples of 1" rd. bar 2" long were preheated at 1500° F. and hardened at the indicated temperature, being held 5 minutes at temperature and oil quenched. They were fractured and rated as to Shepherd fracture grain size and as quenched hardness. Half of each sample was then tempered for two hours at the indicated temperature and their hardness measured between each successive temper.

OIL QUENCHED

| Hardening Temp., °F. | Shepherd Rating | As Quenched Hardness Rc | Tempering Temperature, °F. | | | | | | |
|---|---|---|---|---|---|---|---|---|---|
| | | | 500 | 700 | 900 | 1,000 | 1,050 | 1,100 | 1,200 |
| 1,850 | 9 | 52 | 51 | 53.5 | 54 | 49.5 | 45 | 41 | 32 |
| 1,900 | 9¼ | 56 | 53 | 55 | 56 | 51 | 46 | 43 | 34 |
| 1,950 | 9½ | 57.5 | 55 | 56 | 58 | 54 | 48 | 45 | 37.5 |
| 2,000 | 9¼ | 58 | 55.5 | 56.5 | 58 | 57 | 51.5 | 47.5 | 39 |
| 2,050 | 8 | 59 | 56 | 55 | 58 | 58.5 | 52.5 | 49.5 | 39.5 |
| 2,100 | 7 | 48 | 47.5 | 45 | 46.5 | 54 | 59.5 | 52.5 | 40 |

AIR QUENCHED

| Hardening Temp., °F. | Shepherd Rating | As Quenched Hardness Rc | Tempering Temperature, °F. | | | | | | |
|---|---|---|---|---|---|---|---|---|---|
| | | | 500 | 700 | 900 | 1,000 | 1,050 | 1,100 | 1,200 |
| 1,850 | 9 | 51.5 | 50.5 | 51.5 | 53 | 50 | 44 | 41 | 33 |
| 1,900 | 9¼ | 54 | 53.5 | 54 | 55 | 51.5 | 47 | 43 | 34 |
| 1,950 | 9½ | 57.5 | 56 | 56 | 58 | 55 | 48 | 45 | 36 |
| 2,000 | 9¼ | 59.5 | 57 | 56.5 | 58 | 57 | 51 | 48 | 38 |
| 2,050 | 9 | 58.5 | 56.5 | 55.5 | 57.5 | 58.5 | 53 | 49.5 | 39 |
| 2,100 | 7½ | 51.5 | 49 | 47 | 49 | 57.5 | 59 | 51.5 | 40.5 |

Brinell hardness at elevated temperature

Samples 1" rd. by ¾" long were preheated at 1500° F., hardened at 2000° F., quenched in oil and double tempered at the indicated temperature for two hours. Samples were held at the testing temperature for 30 minutes prior to testing. Hardness of the pieces were checked both before and after the elevated temperature hardness measurement.

| Tempering Temperature, °F. | Heat Treated Hardness, Rc | Testing Temperature, °F. | Hot Hardness, BHN | Room Temperature Hardness After Test, Rc |
|---|---|---|---|---|
| 1,000 | 58 | 600 | 600 | 58 |
| 1,000 | 59 | 800 | 555 | 58.5 |
| 1,000 | 58.5 | 1,000 | 512 | 58.5 |
| 1,100 | 48 | 1,100 | 321 | 48.5 |

Oxidation resistance

Two samples were preheated at 1500° F., hardened at 2000° F., oil quenched and one piece tempered at 1000° F. and the other at 1100° F. for two hours. After being ground to approximately 1" square by .250" thick, they were placed in small crucibles (to collect flaking scale), weighed and put in an electric muffle furnace with an air atmosphere. After exposure for 50 hours and 150 hours at 1000° F. and 1100° F., the crucibles were removed and weighed to determine increase in weight due to oxidation. Knowing the area of exposed surface, the data were converted to increase in weight per unit of area and are expressed in milligrams per square centimeter.

| Grade | Hardening Temperature, °F. | Increase in weight in mg. per cm.² | | | |
|---|---|---|---|---|---|
| | | 1,000° F. Temper | | 1,100° F. Temper | |
| | | 50 hrs. | 150 hrs. | 50 hrs. | 150 hrs. |
| AL-130 | 2,000 | .0609 | .171 | .965 | 1.098 |

Resistance to tempering for long periods of time

After the oxidation resistance samples were weighed, they were ground down below the scale and decarburization and their hardness measured. This supplied data on the resistance to tempering for 150 hours at both 1000° F. and 1100° F.

| Grade | Hardening Temperature, °F. | Rockwell C Hardness After— | | | |
|---|---|---|---|---|---|
| | | 1,000° F. Temper | | 1,100° F. Temper | |
| | | 2 hrs. | 150 hrs. | 2 hrs. | 150 hrs. |
| AL-130 | 2,000 | 58 | 46 | 48 | 37 |

PROPERTIES OF AL-131

Typical analysis

Carbon _____ .85
Manganese _____ .30
Silicon _____ 2.00
Chromium _____ 16.75
Molybdenum _____ 5.25

Hardening and tempering

Samples of 1" rd. bar 2" long were preheated at 1500° F. and hardened at the indicated temperature, being held 5 minutes at temperature and oil quenched. They were fractured and rated as to Shepherd fracture grain size and as quenched hardness. Half of each sample was then tempered for two hours at the indicated temperature and their hardness measured between each successive temper.

OIL QUENCHED

| Hardening Temp., °F. | Shepherd Rating | As Quenched Hardness Rc | Tempering Temperature, °F. | | | | | | |
|---|---|---|---|---|---|---|---|---|---|
| | | | 500 | 700 | 900 | 1,000 | 1,050 | 1,100 | 1,200 |
| 1,850 | 7 | 30 | 31 | 32 | 32 | 31 | 30 | 31 | 30.5 |
| 1,900 | 7½ | 33 | 34 | 36 | 37 | 34.5 | 34 | 34.5 | 34 |
| 1,950 | 7½ | 36 | 36.5 | 37.5 | 38 | 36 | 35 | 35.5 | 36.5 |
| 2,000 | 7¾ | 39 | 39 | 40.5 | 41 | 38.5 | 38.5 | 41 | 39.5 |
| 2,050 | 7 | 41.5 | 41 | 42 | 42.5 | 42.5 | 42 | 43 | 42.5 |
| 2,100 | 6 | 45 | 45 | 43 | 45 | 47 | 49 | 50 | 46.5 |

AIR QUENCHED

| Hardening Temp., °F. | Shepherd Rating | As Quenched Hardness Rc | Tempering Temperature, °F. | | | | | | |
|---|---|---|---|---|---|---|---|---|---|
| | | | 500 | 700 | 900 | 1,000 | 1,050 | 1,100 | 1,200 |
| 1,850 | 7¾ | 27.5 | 28 | 27.5 | 28.5 | 27 | 27 | 28 | 30 |
| 1,900 | 7¾ | 28.5 | 29 | 30 | 30 | 29.5 | 28 | 31 | 31 |
| 1,950 | 8 | 29.5 | 30 | 30 | 31 | 30 | 29 | 30 | 31 |
| 2,000 | 6 | 29.5 | 30 | 31 | 31 | 30.5 | 30 | 30 | 32 |
| 2,050 | 6 | 31 | 31 | 31 | 31 | 31 | 30 | 32.5 | 33.5 |
| 2,100 | 5½ | 30 | 31 | 31 | 31 | 30 | 31 | 32.5 | 35.5 |

Brinell hardness at elevated temperature

Hot Brinell hardness was not run on this grade due to the low hardness obtained during hardening and tempering.

Oxidation resistance

A sample was preheated at 1500° F., hardened at 2050° F., oil quenched and tempered at 1000° F. for two hours. After being ground to approximately 1" square by .250" thick, it was placed in a small crucible (to collect flaking scale), weighed and put in an electric muffle furnace with an air atmosphere. After exposure for 50 hours and 150 hours at 1000° F., the crucible was removed and weighed to determine increase in weight due to oxidation. Knowing the area of exposed surface, the data were converted to increase in weight per unit of area and are expressed in milligrams per square centimeter.

| Grade | Hardening Temperature, °F. | Increase in weight in mg. per cm.²— 1,000° F. Temper | |
|---|---|---|---|
| | | 50 hrs. | 150 hrs. |
| AL-131 | 2,050 | .0414 | .100 |

Resistance to tempering for long periods of time

After the oxidation resistance samples were weighed, they were ground down below the scale and decarburization and their hardness measured. This supplied data on the resistance to tempering for 150 hours at both 1000° F. and 1100° F.

| Grade | Hardening Temperature, °F. | Rockwell C Hardness After— | | | |
|---|---|---|---|---|---|
| | | 1,000° F. Temper | | 1,100° F. Temper | |
| | | 2 hrs. | 150 hrs. | 2 hrs. | 150 hrs. |
| AL-131 | 2,050 | 45 | 38 | 46.5 | 46 |

PROPERTIES OF AL-132

Typical analysis

Carbon _____ .85
Manganese _____ 1.00
Silicon _____ 1.00
Chromium _____ 16.75
Molybdenum _____ 3.25

Hardening and tempering

Samples of 1" rd. bar 2" long were preheated at 1500° F. and hardened at the indicated temperature, being held 5 minutes at temperature and oil quenched. They were fractured and rated as to Shepherd fracture grain size and as quenched hardness. Half of each sample was then tempered for two hours at the indicated temperature and their hardness measured between each successive temper.

OIL QUENCHED

| Hardening Temp., °F. | Shepherd Rating | As Quenched Hardness Rc | Tempering Temperature, °F. | | | | | | |
|---|---|---|---|---|---|---|---|---|---|
| | | | 500 | 700 | 900 | 1,000 | 1,050 | 1,100 | 1,200 |
| 1,850 | 9½ | 49.5 | 49 | 50.5 | 51 | 45 | 41 | 40 | 34 |
| 1,900 | 9½ | 50 | 51 | 51 | 51.5 | 47.5 | 43 | 41.5 | 35.5 |
| 1,950 | 9½ | 55.5 | 53 | 53 | 55 | 50.5 | 46 | 44 | 37.5 |
| 2,000 | 9 | 57 | 55 | 54 | 56 | 53 | 48 | 46 | 38 |
| 2,050 | 8½ | 56.5 | 55 | 53 | 55.5 | 57 | 51 | 48.5 | 41 |
| 2,100 | 8¼ | 46.5 | 45 | 44 | 45 | 58 | 56 | 50 | 42.5 |

AIR QUENCHED

| Hardening Temp., °F. | Shepherd Rating | As Quenched Hardness Rc | Tempering Temperature, °F. | | | | | | |
|---|---|---|---|---|---|---|---|---|---|
| | | | 500 | 700 | 900 | 1,000 | 1,050 | 1,100 | 1,200 |
| 1,850 | 8½ | 43 | 44 | 45 | 45 | 40.5 | 37.5 | 36 | 32.5 |
| 1,900 | 9 | 46 | 47 | 48 | 48 | 44.5 | 40 | 39 | 34 |
| 1,950 | 9½ | 52 | 52 | 52 | 52.5 | 48.5 | 46 | 43 | 36.5 |
| 2,000 | 9¼ | 56.5 | 56 | 54.5 | 57 | 52.5 | 48 | 46 | 40 |
| 2,050 | 9 | 57 | 55 | 54 | 55 | 55.5 | 50 | 48 | 40.5 |
| 2,100 | 8½ | 51 | 48 | 47 | 48 | 55.5 | 55 | 49 | 42.5 |

Brinell hardness at elevated temperature

Samples 1" rd. by ¾" long were preheated at 1500° F., hardened at 2050° F., quenched in oil and double tempered at the indicated temperature for two hours. Samples were held at the testing temperature for 30 minutes prior to testing. Hardness of the pieces were checked both before and after the elevated temperature hardness measurement.

| Tempering Temperature, °F. | Heat Treated Hardness, Rc | Testing Temperature, °F. | Hot Hardness, BHN | Room Temperature Hardness After Test, Rc |
|---|---|---|---|---|
| 1,000 | 57 | 600 | 512 | 57 |
| 1,000 | 56 | 800 | 512 | 55.5 |
| 1,000 | 57 | 1,000 | 477 | 57 |
| 1,100 | 47.5 | 1,100 | 302 | 47.5 |

Oxidation resistance

Two samples were preheated at 1500° F., hardened at 2050° F., oil quenched and one piece tempered at 1000° F. and the other at 1100° F. for two hours. After being ground to approximately 1" square by .250" thick, they were placed in small crucibles (to collect flaking scale), weighed and put in an electric muffle furnace with an air atmosphere. After exposure for 50 hours and 150 hours at 1000° F. and 1100° F., the crucibles were removed and weighed to determine increase in weight due to oxidation. Knowing the area of exposed surface, the data were converted to increase in weight per unit of area and are expressed in milligrams per square centimeter.

| Grade | Hardening Temperature, °F. | Increase in weight in mg. per cm.² | | | |
|---|---|---|---|---|---|
| | | 1,000° F. Temper | | 1,100° F. Temper | |
| | | 50 hrs. | 150 hrs. | 50 hrs. | 150 hrs. |
| AL-132 | 2,050 | .0632 | .215 | .523 | 1.04 |

Resistance to tempering for long periods of time

After the oxidation resistance samples were weighed, they were ground down below the scale and decarburization and their hardness measured. This supplied data on the resistance to tempering for 150 hours at both 1000° F. and 1100° F.

| Grade | Hardening Temperature, °F. | Rockwell C Hardness After— | | | |
|---|---|---|---|---|---|
| | | 1,000° F. Temper | | 1,100° F. Temper | |
| | | 2 hrs. | 150 hrs. | 2 hrs. | 150 hrs. |
| AL-132 | 2,050 | 57 | 45 | 46 | 41.5 |

The superiority of oxidation resistance within the temperature range of 1000° F. to 1100° F. of the alloys of the present invention when compared to the known HTB-2 and HTB-3 alloys is clearly shown in the graphic comparison made in the drawing. In the drawing, the ordinate represents the increase in weight due to oxidation of the metal surfaces in milligrams per square centimeter of samples of the various materials held at temperatures of 1000° F. and 1100° F. (in air) as indicated, whereas the abscissa represents the time at temperature in hours. Referring to the drawing, curves 10, 12, 16, 18 and 20 represent the increase in weight versus time at an oxidizing temperature of 1100° F. for the alloys previously identified as AL-129, AL-130, AL-132, HTB-2 and HTB-3, respectively, whereas curves 22, 24, 26, 28, 30 and 32, respectively, represent the increase in weight versus time at an oxidizing temperature of 1000° F. for the alloys identified as AL-129, AL-130, AL-131, AL-132, HTB-2 and HTB-3. It may be readily observed that all the "AL" materials (AL-129, AL-130, AL-131 and AL-132) which fall within the broad and preferred ranges of the present invention exhibit far superior resistance to oxidation or pickup in weight due to the oxidizing of the metal at a temperature of 1000° F. than the present employed HTB-2 and HTB-3 materials. The best oxidation resistance at 1100° F. is shown by the AL-129 samples which fall in the preferred range of the present invention and is represented by curve 10. The fact that AL-129 exhibits such properties is surprising in that this alloy actually contains lower chromium and silicon content than the AL-131 specimens which also fall within the broad range.

As may be observed, the properties of all of the tested compositions show exceptional high hardness levels on hardening and tempering, resistance to softening when exposed to high temperatures for long periods of time and adequate oxidation resistance. It may be further observed that samples from heat AL-129, which falls within the preferred ranges of the present specification, exhibit greater high hardness levels and resist softening for long periods of time in addition to providing equivalent or superior oxidation resistance at high temperatures than the other materials tested. The AL-129 material is shown to exhibit three times better oxidation resistance than HTB-3 at 1000° F. and twice the oxidation resistance at 1100° F. The AL-130 and 132 analyses are shown to possess relatively high chromium contents, exhibit better oxidation resistance than the HTB-2 and HTB-3 material; however, the AL-130, AL-131 and AL-132 samples display slightly lower hardness than AL-129 but are suitable for slightly lower strength-bearing applications at temperatures of 1000° F. and 1100° F. The AL-131 steel, it may be observed, possesses the lowest hardness but exhibits the highest oxidation resistance at 1000° F. of all the tested materials.

The above examples are given to illustrate the ranges in properties of the alloys of the present invention and in no way limit the invention to the exact compositions and procedures set forth.

We claim:

1. A heat resistant iron base alloy consisting essentially of from .60% to 1.00% carbon, from .20% to 1.10% manganese, from 1.00% to 2.25% silicon, from 11 to 17.50% chromium, from 3.00% to 5.50% molybdenum, and the balance iron, and characterized by high hardness, strength and oxidation resistance.

2. A heat resistant iron base alloy consisting essentially of from .60% to .75% carbon, from .20% to .40% manganese, from 1.00% to 1.25% silicon, from 11.50% to 12.50% chromium, from 5.00% to 5.50% molybdenum, and the balance iron, and characterized by high hardness, strength, and oxidation resistance at temperatures of from about 1000° F. to 1100° F.

3. A heat resistance iron base alloy consisting essentially of from .60% to 1.00% carbon, from .20% to 1.10% manganese, from 1.00% to 2.25% silicon, from 11 to 17.50% chromium, from 3.00% to 5.50% molybdenum, up to 1% vanadium, and the balance iron, and characterized by high hardness, strength, and oxidation resistance.

4. A heat resistant iron base alloy consisting essentially of from .60% to .75% carbon, from .20% to .40% manganese, from 1.00% to 1.25% silicon, from 11.50% to 12.50% chromium, from 5.00% to 5.50% molybdenum, up to 1% vanadium, and the balance iron, and characterized by high hardness, strength, and oxidation resistance at temperatures of from about 1000° F. to 1100° F.

5. A heat resistant iron base alloy consisting essentially of .72% carbon, .24% manganese, 1.04% silicon, 11.63% chromium, 5.29% molybdenum, and the balance iron, and characterized by high hardness, strength, and oxidation resistance at temperatures of from about 1000° F. to 1100° F.

References Cited in the file of this patent

UNITED STATES PATENTS 1,485,635     Skelley     Mar. 4, 1924